(12) United States Patent
Clarke

(10) Patent No.: US 12,180,888 B2
(45) Date of Patent: Dec. 31, 2024

(54) METHOD AND SYSTEM USING A HYDROGEN JET

(71) Applicant: Hydrogen Universe LTD, Edinburgh (GB)

(72) Inventor: Tanya Clarke, Edinburgh (GB)

(73) Assignee: Hydrogen Universe LTD, Edinburgh (GB)

( * ) Notice: Subject to any disclaimer, the term of this patent is extended or adjusted under 35 U.S.C. 154(b) by 1065 days.

(21) Appl. No.: 17/046,274

(22) PCT Filed: Apr. 11, 2019

(86) PCT No.: PCT/GB2019/051050
§ 371 (c)(1),
(2) Date: Oct. 8, 2020

(87) PCT Pub. No.: WO2019/197835
PCT Pub. Date: Oct. 17, 2019

(65) Prior Publication Data
US 2021/0071575 A1    Mar. 11, 2021

(30) Foreign Application Priority Data

Apr. 11, 2018 (GB) ..................................... 1805959

(51) Int. Cl.
*F02C 6/04* (2006.01)
*C25B 1/02* (2006.01)
(Continued)

(52) U.S. Cl.
CPC ................. *F02C 6/04* (2013.01); *H05B 6/00* (2013.01); *H05B 7/06* (2013.01); *H05B 7/08* (2013.01);
(Continued)

(58) Field of Classification Search
CPC ........ B01J 19/087; C01B 3/0094; C25B 1/02; F02C 6/04; H02N 3/00; H02N 11/00;
(Continued)

(56) References Cited

U.S. PATENT DOCUMENTS 3,215,869 A  *  11/1965  Hatsopoulos ............ H02N 3/00
                                                     310/11
2004/0118348 A1    6/2004  Mills
(Continued)

FOREIGN PATENT DOCUMENTS

GB          2526266 A      11/2015
GB          2552711 A       2/2018
(Continued)

OTHER PUBLICATIONS

International Search Report from PCT/GB2019/051050, dated Jul. 5, 2019.

*Primary Examiner* — Raymond R Chai
(74) *Attorney, Agent, or Firm* — Morse, Barnes-Brown & Pendleton, P.C.; Sean D. Detweiler, Esq.

(57) ABSTRACT

A hydrogen jet system includes an evacuated recirculation duct, with a pump to circulate gas around the recirculation duct and a control nozzle to form a jet of gas; means to provide hydrogen gas into the duct; and an electrical device to provide energy into the jet of gas so as to form hydrogen atoms. The jet of gas is arranged to pass through a hollow electrode shell defining opposed apertures that are aligned with the jet of gas; and a target electrode is arranged beyond the electrode shell and also aligned with the jet of gas, so that hydrogen atoms would impact with the target electrode. The electrode shell and the target electrode are each connected to an external electrical terminal. The electrode shell and the target electrode may each define heat exchange channels to remove heat energy during operation.

11 Claims, 1 Drawing Sheet

(51) Int. Cl.
*H02N 3/00* (2006.01)
*H02N 11/00* (2006.01)
*H05B 6/00* (2006.01)
*H05B 7/06* (2006.01)
*H05B 7/08* (2006.01)
*H05H 1/32* (2006.01)
*H05H 1/42* (2006.01)
*H05H 1/48* (2006.01)

(52) U.S. Cl.
CPC ............... *H05H 1/32* (2013.01); *H05H 1/42* (2013.01); *H05H 1/48* (2013.01); *C25B 1/02* (2013.01); *H02N 3/00* (2013.01); *H02N 11/00* (2013.01)

(58) Field of Classification Search
CPC .......... H02N 11/008; H05B 6/00; H05B 7/06; H05B 7/08; H05B 7/22; H05H 1/32; H05H 1/42; H05H 1/48; Y02E 20/14
See application file for complete search history.

(56) References Cited

U.S. PATENT DOCUMENTS

| | | | |
|---|---|---|---|
| 2017/0077376 A1* | 3/2017 | Orlovskaya | H10N 10/857 |
| 2018/0159459 A1* | 6/2018 | Mills | H02S 10/40 |
| 2020/0403555 A1* | 12/2020 | Mills | G21B 1/00 |
| 2023/0045778 A9* | 2/2023 | Mills | F22B 1/18 |

FOREIGN PATENT DOCUMENTS

| | | |
|---|---|---|
| JP | 2005-033960 A | 2/2005 |
| WO | 2015/147703 A2 | 10/2015 |

\* cited by examiner

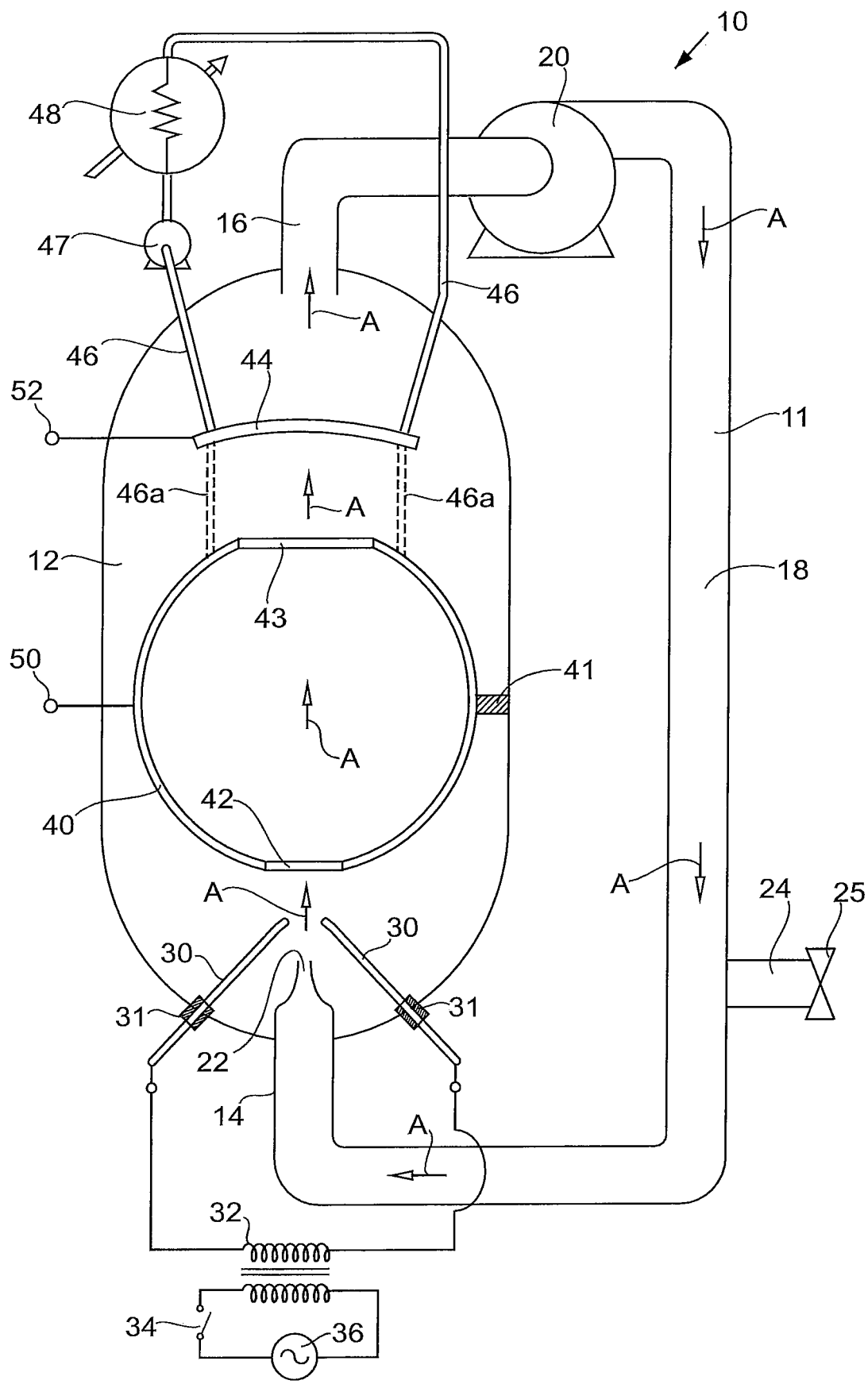

METHOD AND SYSTEM USING A HYDROGEN JET

RELATED APPLICATIONS

This application is a national stage filing under 35 U.S.C. 371 of International Application No. PCT/GB2019/051050, filed Apr. 11, 2019, which claims priority to GB Application No. 1805959.2, filed Apr. 11, 2018. The entire teachings of International Application No. PCT/GB2019/051050, filed Apr. 11, 2019, are incorporated by reference herein.

The present invention relates to a method and a system that uses a hydrogen jet. It may generate an electrical voltage, and it may generate a heating effect. It may be applied in various different settings, and may be applicable on an industrial scale.

According to the present invention there is provided a hydrogen jet system, the system comprising an evacuated recirculation duct, with a pump to circulate gas around the recirculation duct and a control nozzle to form a jet of gas; means to provide hydrogen gas into the duct; a device to provide energy into the jet of gas so as to form hydrogen atoms; a hollow electrode shell defining opposed apertures that are aligned with the jet of gas, so the jet of gas can pass through the electrode shell; and a target electrode beyond the electrode shell and also aligned with the jet of gas, so that hydrogen atoms would impact with the target electrode.

The hollow electrode shell may be generally spherical. The electrode shell and the target electrode may be connected to respective external electrode terminals, whereby an electrical output may be provided, for example to an external load; any voltage that develops between the electrode shell and the target electrode may thus be supplied to an external load connected to the external electrode terminals.

During operation of the system both the hollow electrode shell and the target electrode may become hot, so both the hollow electrode shell and the target electrode may comprise heat exchange devices. For example each may define heat exchange channels through which a heat exchange fluid is passed, so the heat exchange fluid becomes hot, and can be supplied to an external energy generation device. For example if the heat exchange fluid is a vaporisable liquid such as water, the vapour may be used to operate a turbine connected to a generator.

The device to provide energy into the jet of gas may be an electrical device, for example a pair of opposed electrodes between which an electrical arc may be struck. Thus the electrical device to form hydrogen atoms may for example consist of a pair of opposed spaced-apart tungsten electrodes between which electrical DC or AC voltage is applied, so as to produce an electrical arc, arranged such that the hydrogen gas jet passes through the gap between the electrodes, the direction of gas flow through the gap being substantially orthogonal to the direction of the electrical arc. An alternative electrical device consists of a tungsten wire, which when electrically heated can cause dissociation of hydrogen molecules into hydrogen atoms. The device to provide energy into the jet of gas may alternatively be a non-electrical device, for example a device to irradiate the hydrogen with ultraviolet light to form hydrogen atoms (Cario and Frank's method).

In operation, a charge of hydrogen is initially introduced; and that hydrogen is then recirculated. Subsequently, additional hydrogen is provided to replace the losses of hydrogen from the system, for example due to implantation into the heat exchanger, or through other processes. The operation of the pump, in combination with the restriction from the nozzle is such as to ensure that the region of the recirculation duct between the nozzle and the heat exchanger is at a reduced pressure, preferably less than 50 kPa, more preferably less than 20 kPa, for example 10 kPa or 5 kPa or even 1 kPa. In one embodiment the reduced pressure is 10 kPa.

It is surmised that during operation hydrogen molecules are converted to hydrogen atoms, and atoms of hydrogen are ionised to protons and electrons. Electrons that travel in directions away from the jet impact with the hollow electrode, so that the hollow electrode may thereby become negatively charged. For the same reason the target electrode, impacted by protons, would become positively charged.

In a second aspect the invention provides a method of operation, with the provision of hydrogen gas, that utilises such a system.

It will be appreciated that the means to provide hydrogen gas may be an electrolysis cell for electrolysis of water. Such an electrolysis cell may for example use solar power to provide the electric power for the electrolysis. Other means to provide hydrogen gas would include steam reforming of natural gas or other hydrocarbons, and other known industrial processes.

The invention will now be further and more particularly described, by way of example only, and with reference to the accompanying drawing, in which:

FIG. 1 shows a flow diagram of a system of the invention, the view corresponding to a side view.

Referring to FIG. 1, a hydrogen jet system 10 includes a recirculation duct 11 consisting of a process chamber 12 with an inlet pipe 14 at one end, and an outlet pipe 16 at the opposite end, the inlet pipe 14 and the outlet pipe 16 being interconnected by a pipe 18 and a pump 20. The inlet pipe 14 defines a nozzle 22 where it opens into the process chamber 12; and a branch pipe 24 with a valve 25 enables gas to be extracted from or introduced into the recirculation duct 11. The recirculation duct 11 thus defines a closed loop, around which a gas can be circulated by the pump 20. The flow of the gas is indicated by arrows A.

Two rod-shaped tungsten electrodes 30 project through seals 31 in the wall of the process chamber 12 so that the tips of the electrodes 30 are opposite each other a short distance from the end of the nozzle 22, so when a gas jet emerges from the nozzle 22 the tips of the electrodes 30 are on opposite sides of the gas jet. The electrodes 30 are inclined at about 45° to the axis of the nozzle 22 and so of the resulting gas jet. The seals 31 allow the electrodes 30 to be slid in or out, to adjust the separation between the opposed tips. The tungsten electrodes 30 may for example be of diameter between 3 mm and 5 mm, by way of example. The electrodes are connected to an external electrical circuit (represented schematically) including a load transformer 32 with a secondary coil and a primary coil, the electrodes 30 being connected to opposite ends of the secondary coil of the load transformer 32, and the primary coil of the load transformer 32 being connected through a switch 34 to an AC power supply 36.

A hollow, double-walled spherical electrode 40 is mounted within the process chamber 12, supported by electrical insulators 41 (only one of which is shown). The spherical electrode 40 defines two diametrically opposed apertures 42 and 43 that are aligned with the axis of the nozzle 22 and so of the resulting gas jet, the aperture 43 that is further from the nozzle 22 being wider to allow for divergence of the gas jet, so as indicated by the arrows A the jet can pass right through the spherical electrode 40 to emerge beyond it.

Towards the other end of the process chamber 12 is a curved heat exchange target 44 which defines flow paths within it for a coolant, the heat exchange target 44 being connected by coolant flow ducts 46 to a pump 47 and an external heat exchanger 48 that are outside the process chamber 12.

Electrical terminals 50 and 52 that are outside the process chamber 12 are connected electrically to the spherical electrode 40 and to the heat exchange target 44 respectively.

The spherical electrode 40 is double-walled, and so provides a flow path within it for a coolant. As indicated in broken lines, the spherical electrode 40 may also be connected by coolant flow ducts 46a that connect to the coolant flow ducts 46 and so to the pump 47 and the external heat exchanger 48 outside the process chamber 12. By way of example the coolant may be arranged to flow in series through the spherical electrode 40 and the heat exchange target 44, to remove heat from each.

In operation some hydrogen gas is introduced into the recirculation duct 11, and is circulated by the pump 20. The quantity of hydrogen, the operation of the pump 20 and the restriction from the nozzle 22 are such that the pressure within the process chamber 12 is 10 kPa. During operation additional hydrogen is provided to replace the losses of hydrogen from the system.

A coolant fluid, which may for example be a liquid such as water, or a liquid with a boiling point above 100° C., or a gas such as nitrogen, is pumped by the pump 47 through the spherical electrode 40 and the heat exchange target 44; during operation the spherical electrode 40 and the heat exchange target 44 become hot, and the coolant fluid removes this heat. The heat may be utilised directly (for example by providing superheated water to a steam turbine connected to a generator), but in FIG. 1 the heat is transferred in two stages, first being transferred to the coolant fluid that flows through the spherical electrode 40 and the heat exchange target 44, and then being transferred to a secondary coolant fluid that is caused to flow through the external heat exchanger 48. The secondary coolant fluid may be used directly to provide heat, for example to heat a domestic property or a greenhouse, or may be used to generate electricity. Ideally the removed heat is used to supply combined heat and power in order to maximise the useful output.

The switch 34 is activated to provide electrical voltage between the tips of the electrodes 30, and thereby to strike an arc in the low-pressure hydrogen between the tips of the electrodes 30. The voltage applied between the electrodes 30 may be greater than 50 V, for example 100 V, 150 V or 200 V or even higher. It may be necessary to bring the tips of the electrodes 30 slightly closer together, to initiate the arc, and then to move the tips further apart. The separation between the tips of the electrodes 30, during normal operation, may for example be between 1 mm and 5 mm, for example 3 mm.

The electrical power input into the system 10 is primarily the electrical power provided to the electrodes 30 by the AC power supply 36. This clearly depends upon the electric current that flows in the arc, as well as the voltage. It will be appreciated that this arrangement has some similarity to the hydrogen arc welding device developed by Langmuir in about 1911, which was found capable of welding materials including tungsten; but in the present case the process is carried out at reduced pressure and in the presence only of hydrogen gas. The energy needed to bring about the dissociation of hydrogen molecules into atoms is about 420 kJ/mole, so that is the amount of energy conventionally expected to be given out as heat if the atoms recombine, whether in the gas stream or on impact with the surface of the heat exchange target 44. However, in this case it is surmised that there is considerably more thermal energy available from the gas jet.

The energy put into the hydrogen gas as it passes through the arc causes dissociation of hydrogen molecules into hydrogen atoms. The degree of dissociation will depend upon the temperature of the arc, and the electrical power provided into the arc. It can be expected that hydrogen molecules will be provided with a range of different energies by the arc, and at least some hydrogen atoms will become ionised. Consequently the gas jet flowing through the process chamber 12 includes hydrogen molecules, hydrogen atoms, and ions, that is to say electrons and protons, predominantly protons. The electrons and protons are envisaged as being the primary source of energy.

If electrons travel in directions that take them outside and away from the gas jet, then they will impact on the inside of the spherical electrode 40. Consequently the spherical electrode 40 would become negative. In comparison the heat exchange target 44 will become positive, because of the absence of those same electrons.

It has been surmised, for example by Dr. Ivan A. Strilets (Journal of Modern Physics, 2014, 5, 1302-1320) that hydrogen atoms may be unstable, and spontaneously ionise. If that is the case, then at least some (and possibly the majority) of the hydrogen atoms produced in the arc may ionise before they reach the heat exchange target 44. This article also suggests that the resulting electrons would have significant kinetic energy, about 1300 KJ/mole, and this makes it more likely that electrons will divert from the gas jet to reach the spherical electrode 40. It has been surmised that at least the electrons may thereby provide additional energy. Energy may also be obtained from the protons that bombard the heat exchange target 44. Consequently it has been suggested that the amount of thermal energy available from the spherical electrode 40 and the heat exchange target 44 may be considerably greater than the electrical energy provided by the power supply 36.

It will be appreciated that the above description is by way of example only, and that the system may be modified in various ways while remaining within the scope of the invention, which is defined by the claims. For example, instead of a single nozzle 22 aiming at the gap between the electrodes 30, the gas might instead be fed through two nozzles, one alongside each electrode 30, so that the gas streams meet at the gap and flow out as indicated by the arrow A as shown. Instead of using a double-structure for the hollow, spherical electrode 40, the electrode 40 might instead have a single wall, with heat exchange ducts in heat exchange contact with its outside surface. Furthermore, the hollow electrode 40 might be non-spherical, for example being elliptical in cross-section, so the shape is that of the surface of revolution of an ellipse. Indeed the hollow electrode 40 might have a totally different shape, for example being shaped like a rectangular box, or like a hollow cylinder, a hollow cone, or a hollow pyramid. Instead of providing a single heat exchange system to remove heat from the spherical electrode 40 and from the heat exchange target 44, there may instead be two separate heat exchange systems, one to remove heat from the spherical electrode 40, and another to remove heat from the heat exchange target 44.

The invention claimed is:

1. A hydrogen jet system, the system comprising an evacuated recirculation duct, with a pump to circulate gas around the evacuated recirculation duct and a control nozzle to form a jet of gas; means to provide hydrogen gas into the duct; a device to provide energy into the jet of gas so as to form hydrogen atoms; a hollow electrode shell defining opposed apertures that are aligned with the jet of gas, so the jet of gas can pass through the hollow electrode shell; and a target electrode beyond the electrode shell and also aligned with the jet of gas, so that hydrogen atoms would impact with the target electrode, wherein the hollow electrode shell is spherical, wherein the opposed apertures are aligned with the axis of the control nozzle, and wherein the hollow electrode shell and the target electrode are connected to respective external electrode terminals, whereby an electrical output may be provided.

2. The system of claim 1, wherein the hollow electrode shell comprises a heat exchange device.

3. The system of claim 2, wherein the heat exchange device is connected to an external energy generation device.

4. The system of claim 1, wherein the target electrode comprises a heat exchange device.

5. The system of claim 4, wherein the heat exchange device is connected to an external energy generation device.

6. The system of claim 1, wherein the device to provide energy into the jet of gas is an electrical device.

7. The system of claim 6, wherein the electrical device consists of a pair of opposed tungsten electrodes, spaced apart to define a gap, and means to apply an electrical DC or AC voltage between the electrodes so as to produce an electrical arc.

8. The system of claim 7, wherein the pair of tungsten electrodes are arranged such that the hydrogen gas jet passes through the gap between the electrodes, the direction of gas flow through the gap being orthogonal to the direction of the electrical arc.

9. An energy transfer method comprising introducing a charge of hydrogen into a system as claimed in claim 1, activating the pump to recirculate the hydrogen and so create the jet of gas, and energising the device to provide energy into the jet of gas.

10. The method of claim 9, wherein the hollow electrode shell or the target electrode of the system of claim 1 comprises a heat exchange device, and wherein the region of the recirculation duct between the nozzle and the heat exchange device is at a reduced pressure, less than 20 kPa.

11. The method of claim 10, wherein the reduced pressure is 10 kPa.

* * * * *